(12) United States Patent
Petersen

(10) Patent No.: US 9,164,595 B2
(45) Date of Patent: *Oct. 20, 2015

(54) MECHANICAL ACTUATOR APPARATUS FOR A TOUCHSCREEN

(71) Applicant: Darren C. Petersen, Montclair, NJ (US)

(72) Inventor: Darren C. Petersen, Montclair, NJ (US)

( * ) Notice: Subject to any disclaimer, the term of this patent is extended or adjusted under 35 U.S.C. 154(b) by 315 days.

This patent is subject to a terminal disclaimer.

(21) Appl. No.: 13/789,807

(22) Filed: Mar. 8, 2013

(65) Prior Publication Data

US 2014/0253446 A1     Sep. 11, 2014

(51) Int. Cl.
*G06F 3/0338* (2013.01)
*G06F 3/041* (2006.01)

(52) U.S. Cl.
CPC .............. *G06F 3/0338* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 4,172,597 A * | 10/1979 | Smith et al. .................. | 273/239 |
| 4,366,355 A | 12/1982 | Oelsch | |
| 4,600,807 A | 7/1986 | Kable | |
| 4,600,819 A | 7/1986 | Twyford | |
| 4,676,509 A * | 6/1987 | Bishop .......................... | 273/239 |
| 4,701,702 A | 10/1987 | Krüger | |
| RE35,329 E * | 9/1996 | Murakami et al. ......... | 178/18.07 |
| 6,492,978 B1 * | 12/2002 | Selig et al. .................... | 345/173 |
| 6,606,081 B1 | 8/2003 | Jaeger et al. | |
| 6,628,266 B1 * | 9/2003 | Aguilar et al. ............... | 345/161 |
| 6,903,662 B2 | 6/2005 | Rix et al. | |
| 6,950,089 B1 | 9/2005 | Jaeger | |
| 7,391,410 B2 | 6/2008 | Lutnaes | |
| 7,924,145 B2 | 4/2011 | Yuk et al. | |
| 8,138,869 B1 | 3/2012 | Lauder et al. | |
| 8,143,982 B1 | 3/2012 | Lauder et al. | |
| 8,143,983 B1 | 3/2012 | Lauder et al. | |
| 8,199,114 B1 | 6/2012 | Jaeger et al. | |
| 8,206,047 B1 * | 6/2012 | Isaac et al. .................... | 400/491 |
| 8,242,868 B2 | 8/2012 | Lauder et al. | |
| 8,310,351 B2 | 11/2012 | Krahenbuhl et al. | |
| 8,330,713 B2 | 12/2012 | Stelandre et al. | |

(Continued)

FOREIGN PATENT DOCUMENTS

| | | |
|---|---|---|
| DE | 102009006153 | 7/2010 |
| KR | 10-2012-0099902 | 9/2012 |

(Continued)

OTHER PUBLICATIONS

PCT International Search Report and the Written Opinion in International App. No. PCT/US2014/019756 dated Jul. 28, 2014 (9 pp.).

(Continued)

*Primary Examiner* — Antonio Xavier
(74) *Attorney, Agent, or Firm* — Dinesh Agarwal, P.C

(57) ABSTRACT

In combination with an electronic device including a touchscreen with a first user interaction surface and a second surface, a joystick apparatus includes a joystick with a handle portion and a cooperating base portion with an upstanding sleeve. The handle portion includes a skirt portion for operably engaging the sleeve to thereby secure a first magnetic member therebetween. An attachment member is positioned on the second surface of the touchscreen and includes a second magnetic member for engaging the first magnetic member. The base portion of the joystick includes a conductive member for contacting the first user interaction surface of the touchscreen.

40 Claims, 3 Drawing Sheets

(56) References Cited

U.S. PATENT DOCUMENTS

| | | | |
|---|---|---|---|
| 8,576,192 B1* | 11/2013 | Reeves et al. | 345/173 |
| 2002/0024503 A1* | 2/2002 | Armstrong | 345/167 |
| 2003/0235452 A1* | 12/2003 | Kraus et al. | 400/472 |
| 2004/0056781 A1* | 3/2004 | Rix et al. | 341/20 |
| 2004/0060217 A1* | 4/2004 | Ray et al. | 40/638 |
| 2005/0164148 A1* | 7/2005 | Sinclair | 434/112 |
| 2005/0259074 A1* | 11/2005 | Lutnaes | 345/161 |
| 2006/0007179 A1* | 1/2006 | Pihlaja | 345/173 |
| 2006/0256090 A1* | 11/2006 | Huppi | 345/173 |
| 2006/0284710 A1* | 12/2006 | Takatsuka | G06F 3/0202 335/205 |
| 2008/0012473 A1* | 1/2008 | Horikiri | B01J 20/261 313/504 |
| 2008/0116885 A1 | 5/2008 | Van Zon et al. | |
| 2008/0238879 A1* | 10/2008 | Jaeger et al. | 345/173 |
| 2008/0303800 A1* | 12/2008 | Elwell | 345/173 |
| 2009/0084214 A1* | 4/2009 | Sakai et al. | 74/471 XY |
| 2009/0121848 A1* | 5/2009 | Yuk et al. | 340/407.2 |
| 2009/0213073 A1 | 8/2009 | Obermeyer et al. | |
| 2010/0020042 A1* | 1/2010 | Stelandre et al. | 345/174 |
| 2010/0079403 A1* | 4/2010 | Lynch et al. | 345/174 |
| 2010/0081505 A1* | 4/2010 | Alten et al. | 463/36 |
| 2010/0097327 A1* | 4/2010 | Wadsworth | 345/173 |
| 2010/0141411 A1* | 6/2010 | Ahn et al. | 340/407.2 |
| 2010/0265176 A1* | 10/2010 | Olsson et al. | 345/161 |
| 2011/0005662 A1* | 1/2011 | Sung | G06F 3/044 156/153 |
| 2011/0157056 A1* | 6/2011 | Karpfinger | 345/173 |
| 2011/0199325 A1 | 8/2011 | Payne | |
| 2011/0234507 A1* | 9/2011 | Chou et al. | 345/173 |
| 2011/0248947 A1 | 10/2011 | Krahenbuhl et al. | |
| 2012/0066873 A1* | 3/2012 | Lauder et al. | 24/303 |
| 2012/0098782 A1* | 4/2012 | Nam | 345/174 |
| 2012/0154285 A1* | 6/2012 | Nagao | G06F 3/0219 345/168 |
| 2012/0156439 A1* | 6/2012 | Mori | B32B 3/02 428/189 |
| 2012/0162122 A1* | 6/2012 | Geaghan | 345/174 |
| 2012/0169597 A1* | 7/2012 | Liotta | 345/161 |
| 2012/0191304 A1* | 7/2012 | McKee et al. | 701/49 |
| 2012/0242592 A1* | 9/2012 | Rothkopf | G06F 1/1652 345/173 |
| 2012/0313873 A1* | 12/2012 | Bright et al. | 345/173 |
| 2012/0327021 A1* | 12/2012 | Ryu et al. | 345/174 |
| 2013/0002571 A1* | 1/2013 | Skinner | 345/173 |
| 2013/0038549 A1* | 2/2013 | Kitada et al. | 345/173 |
| 2013/0076649 A1* | 3/2013 | Myers | H04M 1/0268 345/173 |
| 2013/0207911 A1* | 8/2013 | BARTON et al. | 345/173 |
| 2013/0215029 A1* | 8/2013 | Comer, Jr. | 345/161 |
| 2013/0271384 A1* | 10/2013 | Chuang et al. | 345/173 |
| 2013/0278514 A1* | 10/2013 | Jeon et al. | 345/173 |
| 2014/0014486 A1* | 1/2014 | Knighton | H01H 13/52 200/5 A |
| 2014/0049475 A1* | 2/2014 | Argiro | G06F 3/041 345/172 |
| 2014/0077911 A1* | 3/2014 | Raisch | 335/306 |
| 2014/0176481 A1* | 6/2014 | Zhang | G06F 3/044 345/174 |
| 2014/0253446 A1* | 9/2014 | Petersen | 345/161 |
| 2014/0347575 A1* | 11/2014 | Shih | G06F 3/044 349/12 |

FOREIGN PATENT DOCUMENTS

| | | |
|---|---|---|
| WO | WO 2012/005463 A2 | 1/2012 |
| WO | WO 2012/094198 A1 | 7/2012 |
| WO | WO 2012/139203 A1 | 10/2012 |

OTHER PUBLICATIONS

PCT International Search Report and the Written Opinion in International App. No. PCT/US2014/019755 dated Sep. 9, 2014 (13 pp.).
"Touchscreen" *Wikipedia*, the free encyclopedia, http://en.wikipedia.org/wiki/Touchscreen. Accessed Feb. 21, 2013, 9 pp.
U.S. Appl. No. 13/789,787, filed Mar. 8, 2013.
Office Action dated Mar. 19, 2015, in co-pending U.S. Appl. No. 13/789,787, filed Mar. 8, 2013.

\* cited by examiner

MECHANICAL ACTUATOR APPARATUS FOR A TOUCHSCREEN

FIELD AND BACKGROUND OF THE INVENTION

The present invention is generally directed to computer or electronic input devices, and more particularly to a mechanical actuator apparatus for a touchscreen or touch sensing display having a touch sensing surface.

The recent explosion in the popularity of hand-held electronic devices, such as smartphones, tablet computers, etc., has brought to the forefront touch sensing displays, touchscreens, and the like. Gone are the days of bulky cellular or mobile phones and huge laptops, which included the old-style keyboards. The modern cellular phones, for example, are known as "smartphones" that have the capability to perform many functions other than merely being a communication device. More particularly, these smartphones function as computing devices, GPS (global positioning system) devices, financial transaction devices, and perform many other functions that were previously performed by multiple individual devices. The old-style keypad or keyboard has now been replaced by a touchscreen or touch sensing display, which typically includes a touch sensing surface. The touchscreen or touch sensing display generally includes a virtual or digital onscreen keyboard in place of the old-style physical keyboard.

A touchscreen is an electronic visual display that a user can control via simple or multi-touch gestures by touching the screen with one or more fingers, a stylus, a tracer, or some other mechanical actuator, or other object, such as specially coated gloves. Various touchscreen technologies are currently available that utilize different methods of sensing touch. The examples include resistive, surface acoustic wave, capacitive, infrared grid, infrared acrylic projection, optical imaging, dispersive signal technology, acoustic pulse recognition, etc. In a typical application, the system determines the intended command based on the controls displayed on the screen and the location of the touch. "Touchscreen" Wikipedia, the free encyclopedia, http://en.wikipedia.org/wiki/Touchscreen. Accessed Feb. 21, 2013, 9 pp.

The smartphones, tablet computers, and the like, are also now being used to play electronic games that were traditionally played on home computers utilizing various accessories, such as joysticks, steering wheels, game controllers, and other similar input devices. In this regard, although a tablet or smartphone may include a virtual input device, such as an onscreen joystick, such arrangement lacks the full experience or the feel of manipulating, for example, a physical joystick. Therefore, the users, and particularly the electronic game enthusiasts, appreciate the use of a physical mechanical actuator, such as a joystick, in connection with an electronic device, such as a tablet computer, smartphone, and the like.

Various electronic devices, touch sensitive screens and displays, and input devices are disclosed in U.S. Pat. Nos. 4,600,807; 6,606,081 B1; 6,903,662B2; 6,950,089B1; 7,391,410B2; 7,924,145B2; 8,138,869B1; 8,143,982B1; 8,143,983B1; 8,199,114B1; 8,242,868B2; 8,310,351B2; 8,330,713B2; U.S. Publications Nos. 2006/0007179A1; 2006/0256090A1; 2010/0079403A1; 2011/0199325A1; 2011/0248947A1; 2012/0169597A1; 2013/0002571A1; and Foreign/PCT patent documents DE 102009006153; KR 10-2012-0099902; WO 2012/005463 A2; WO 2012/094198 A1, and WO 2012/139203 A1.

In view of the popularity of smartphones, tablets, and other electronic devices using touchscreens, and to provide the look-and-feel of an external input device, such as a joystick, slider, knob, directional pad, or the like, there is a need in the industry for a mechanical actuator apparatus that provides a user with the real look-and-feel of an actual physical actuator, when used on a touchscreen.

ASPECTS AND BRIEF SUMMARY OF THE INVENTION

The present disclosure is directed to various aspects of the present invention.

One aspect of the present invention is to provide a mechanical actuator apparatus for a touchscreen of an electronic device.

Another aspect of the present invention is to provide a joystick apparatus for a touchscreen of an electronic device.

Another aspect of the present invention is to provide a mechanical actuator or joystick apparatus, which allows an external actuator, such as a joystick, to be directly mounted over and engage a touch sensing surface of an electronic device. The apparatus allows a quick and easy substitution of the actuator or joystick, as needed.

Another aspect of the present invention is to provide a mechanical actuator or joystick apparatus, which allows an external actuator, such as a joystick, to be directly mounted over and engage a touch sensing surface of an electronic device. The apparatus allows a quick and easy connect or disconnect of the actuator or joystick, and positioning thereof anywhere over the touch sensing surface.

Another aspect of the present invention is to provide in combination with an electronic device including a touchscreen with a first user interaction surface and a second surface, a joystick apparatus including a joystick with a handle portion and a cooperating base portion with an upstanding sleeve. The handle portion includes a skirt portion for operably engaging the sleeve to thereby secure a first magnetic member therebetween. An attachment member is positioned on the second surface of the touchscreen and includes a second magnetic member for engaging the first magnetic member. The base portion further includes a conductive member for contacting the first user interaction surface of the touchscreen.

Another aspect of the present invention is to provide an electronic device, which comprises a touchscreen including a first user interaction surface and a second surface, and a magnetic mesh member positioned on the second surface for cooperating with an external mechanical actuator, wherein the second surface is disposed within the electronic device.

Another aspect of the present invention is to provide a method of attaching a joystick to a touchscreen of an electronic device, which comprises a) providing a touchscreen with a user interaction surface and a generally opposite second surface including a magnetic mesh mounted thereto, b) providing a joystick including a magnetic member, and c) manipulating the joystick over the touchscreen so as to engage the magnetic member with the magnetic mesh.

Another aspect of the present invention is to provide a method of attaching a joystick to a touchscreen of an electronic device, which includes a) providing a joystick including a first magnetic member, b) providing a touchscreen, including i) a user interaction surface and a generally opposite second surface, ii) the second surface including an attachment member mounted thereto, and iii) the attachment member including a second magnetic member, and c) manipulating the joystick over the touchscreen so as to engage the first magnetic member with the second magnetic member.

In summary, the present invention provides a mechanical actuator apparatus that can be easily used with the touchscreen of an electronic device, such as a tablet, cellular phone, fablet, phablet, etc., and which allows the user with the real look-and-feel of an external input device, such as a joystick. The actuator apparatus further provides the flexibility of easily switching between external input devices, as desired.

BRIEF DESCRIPTION OF THE DRAWINGS

One of the above and other aspects, novel features and advantages of the present invention will become apparent from the following detailed description of a preferred embodiment(s) of the invention, as illustrated in the drawings, in which.

DETAILED DESCRIPTION OF THE PREFERRED EMBODIMENT(S) OF THE INVENTION

Figure 1:
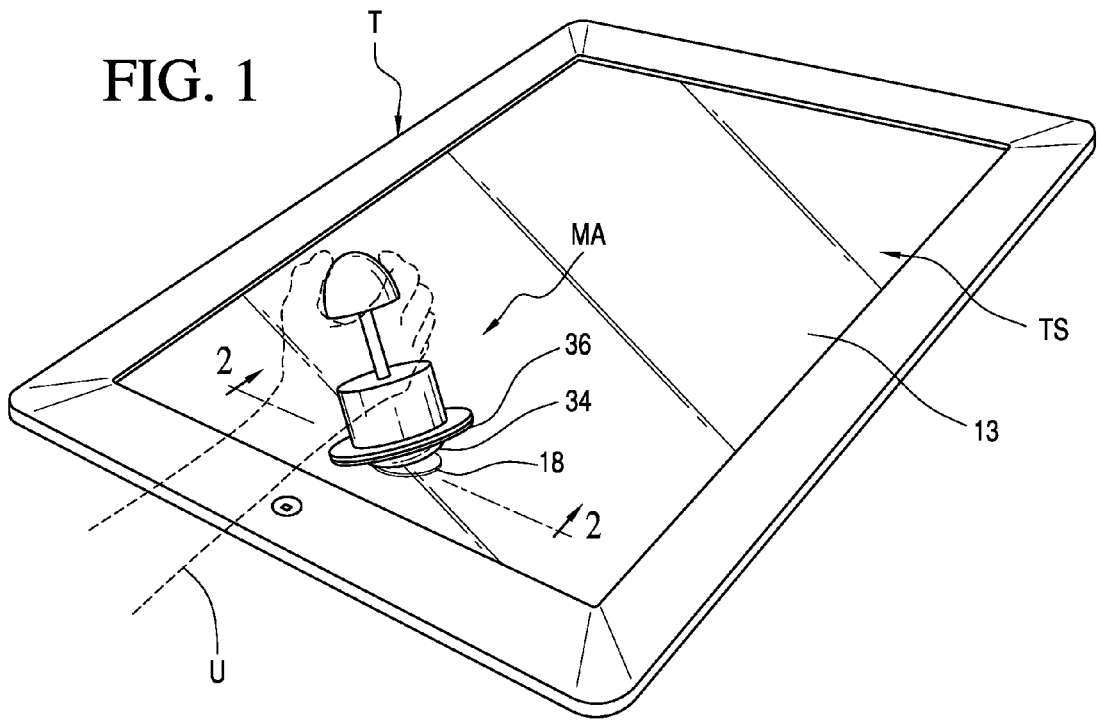
FIG. 1 is a perspective view of a preferred embodiment of a mechanical actuator apparatus of the present invention, shown in use in conjunction with a tablet.
Figure 2:
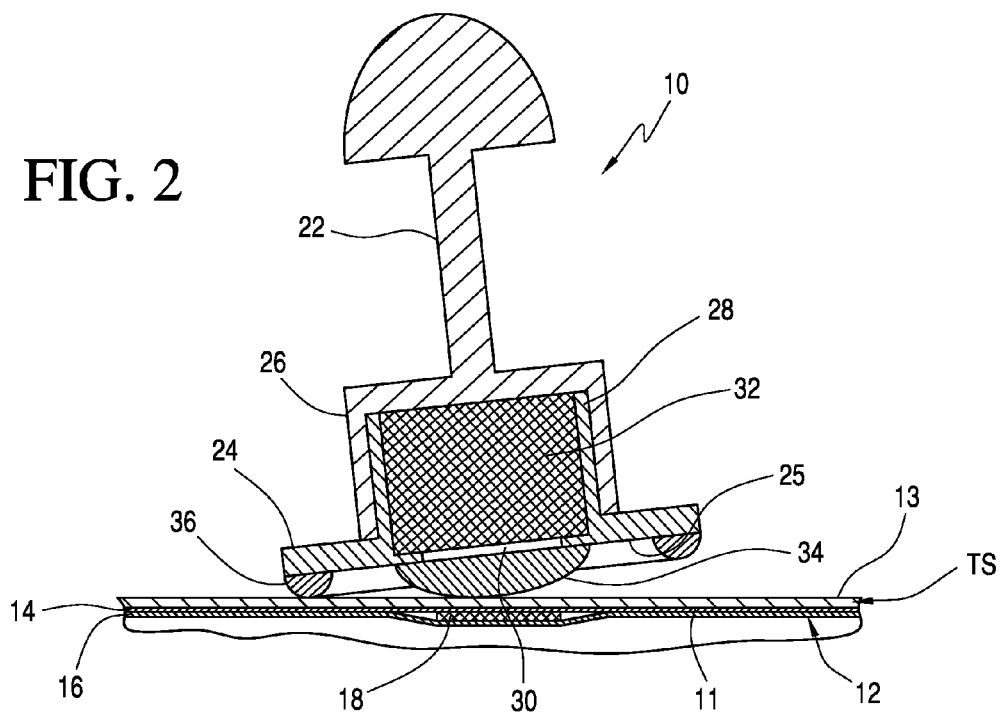
FIG. 2 is an enlarged cross-sectional view taken along line 2-2 of FIG. 1.
Figure 3:
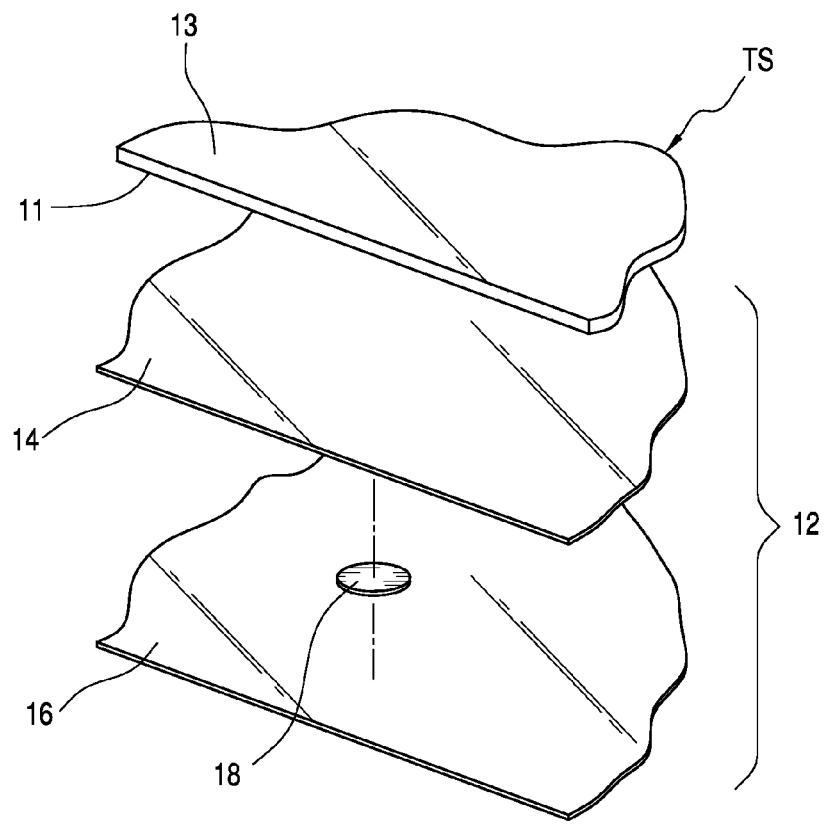
FIG. 3 is a partial exploded view of the mechanical actuator shown in FIG. 1.
Figure 5:
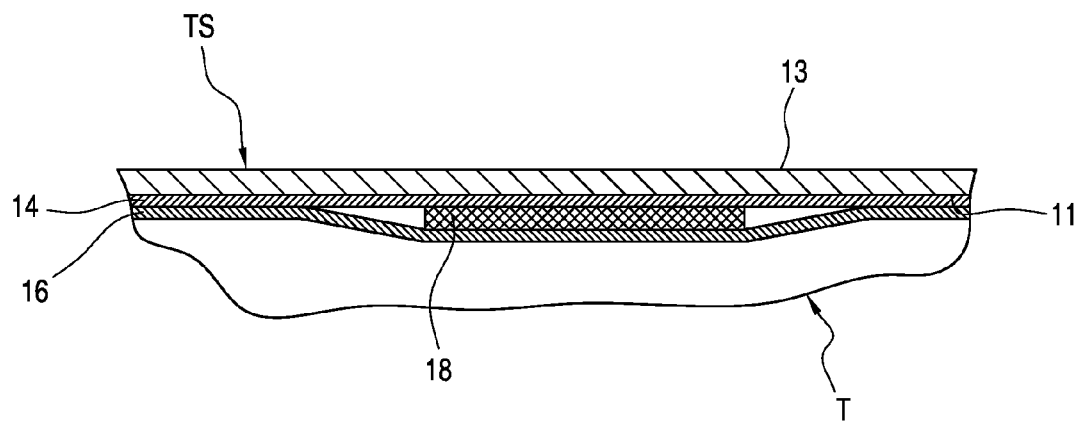
FIG. 5 is an enlarged view similar to FIG. 2, shown without the mechanical actuator (joystick)

As best shown in FIGS. 1-3, the mechanical actuator apparatus MA, in accordance with a preferred embodiment of the invention, includes a joystick 10, and an attachment member 12, both configured and constructed to function in operative engagement with each other. In particular, the attachment member 12 is mounted on the underside 11 of the touchscreen TS of a tablet T (FIG. 3), by using a suitable adhesive, or electrostatic, electromagnetic, or magnetostatic charge, or other suitable technique. In this regard, one would appreciate that in an assembled electronic device, the underside 11 would face the interior thereof, while the opposite user interaction surface 13 would be external to the electronic device and face the user U.

The attachment member 12, preferably includes top and bottom clear films 14 and 16, sandwiching therebetween a magnetic member 18 of a suitable size and shape at a preferred location. In particular, the films 14 and are preferably held together by an adhesive, or electrostatic, electromagnetic, or magnetostatic charge, or some other suitable means. The films 14 and 16 are preferably made of a flexible, yet durable polyethylene or the like material having a thickness in the range of about 0.2 mm to 4 mm, or an alternative range to suit the needs of a manufacturer of the touchscreen and/or the applicable electronic device.

The size of the attachment member 12 is selected to preferably correspond to the size of the touchscreen underside 11. It is noted, however, that it is within the scope of the present invention to vary the overall size of the attachment member 12 to be smaller or larger than the size of the touchscreen TS.

It is also noted herewith that it is within the scope of the present invention to use only one film, instead of two, as illustrated.

Referring to FIG. 2, the preferred structural details of the joystick 10 will now be described. As shown, the joystick 10 includes an upper handle portion 22, and a cooperating lower base portion 24. The handle portion 22 includes a skirt 26 that engages with an upstanding sleeve 28 of the base portion 24. The skirt 26 and sleeve 28, together define therebetween a recess 30 for accommodating a magnetic member 32 of a suitable size and shape. It is noted herewith that the interfitting construction and arrangement of the skirt 26 and sleeve 28 may be varied or reversed, if needed. For instance, in an alternate arrangement, the skirt 26 would fit inside the sleeve 28, instead of sliding over, as shown in FIG. 2.

The joystick 10 further includes a non-conductive pad 34 or the like member positioned preferably centrally on the base portion 24. The thickness of the non-conductive member 34 is selected to keep the bottom surface 25 of the base portion 24 a preferred distance (0.5 mm-3 mm) from the user interaction surface 13, thereby allowing a user to manipulate or rock the joystick 10, during use. In this regard, a continuous (or segmented) strip of conductive pad 36 or the like is provided along the periphery on the bottom surface 25 of the base portion 24. Alternatively, the conductive pad 36 may cover the entire bottom surface 25. The conductive pad 36 is preferably made of a material including silicone resin, vinyl chloride resin, siloxane resin, and/or a polyolefin resin, doped with a conductive metal or filler. Preferably, the height of the joystick 10 is 30-60 mm. One skilled in the art would readily appreciate that by manipulating the joystick 10, a user U can easily make a contact with the user interaction surface 13, as desired (FIGS. 1 and 2).

From the above description, and as illustrated in FIGS. 1-3 and 5, it would be readily appreciated that by mounting the attachment member 12 on the underside 11 of the touchscreen TS, and manipulating the joystick 10 over the magnetic member 18, the joystick 10 can be held thereover due to the magnetic force between the magnetic members 18 and 32. In this regard, it is noted herewith that the term "magnetic member" as used herein, includes, but not limited to, a permanent magnet or electromagnet, and a member that is attractable to or by a magnet.

Figure 4:
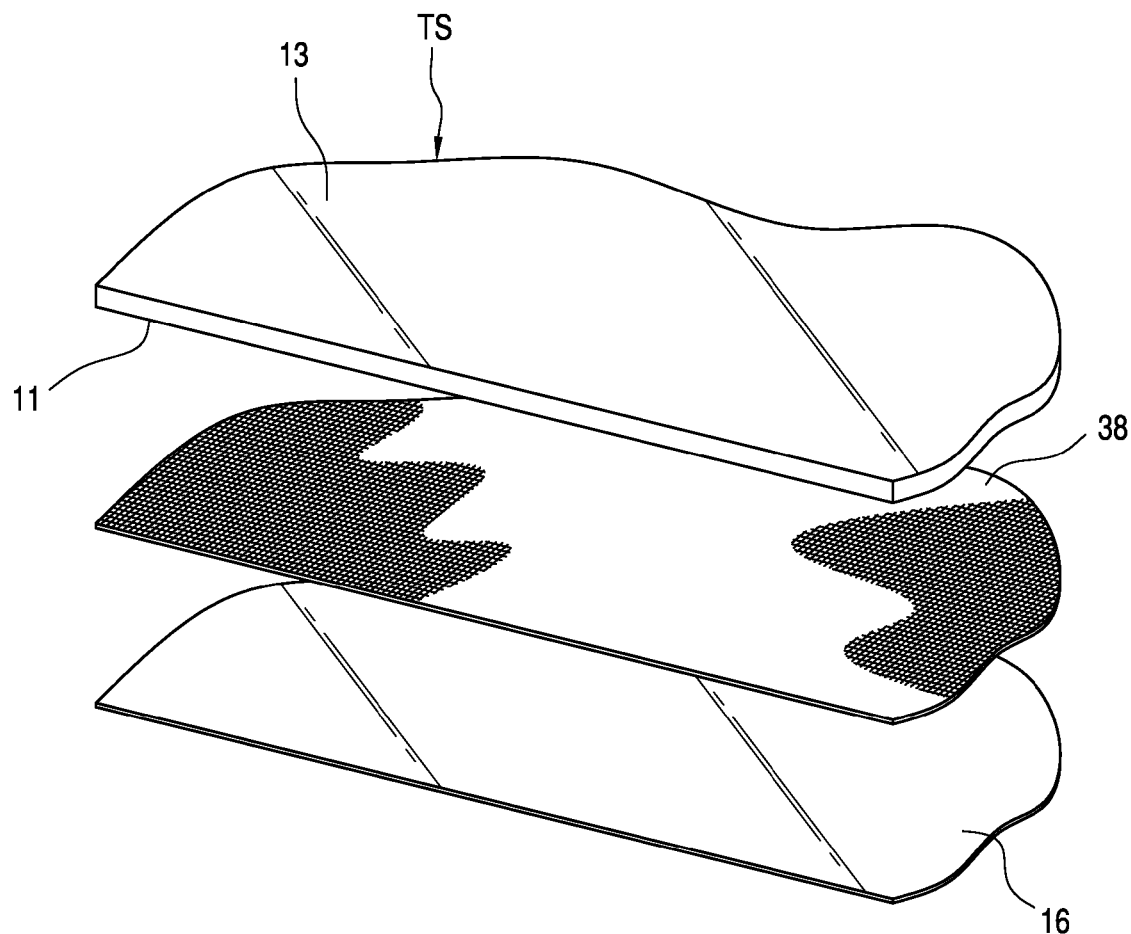
FIG. 4 is a view similar to FIG. 3, showing an alternate preferred embodiment of the mechanical actuator apparatus of the present invention.
Figure 6:
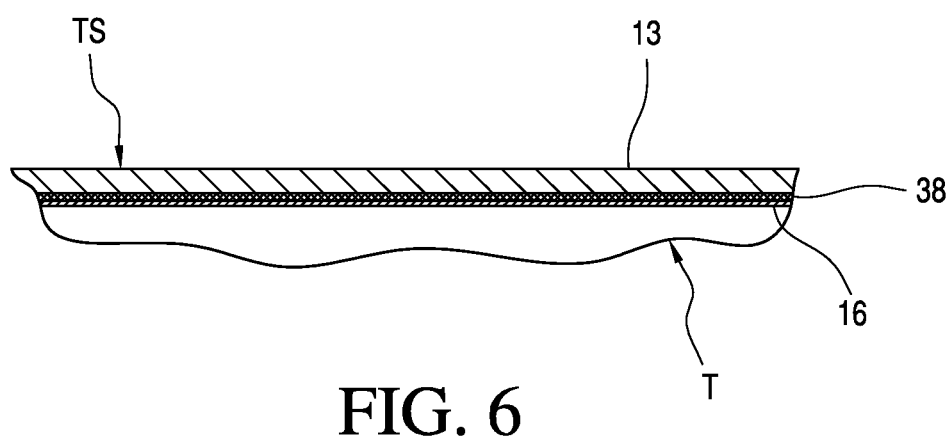
FIG. 6 is a view similar to FIG. 5, showing the alternate embodiment of FIG. 4.

FIGS. 4 and 6 illustrate an alternate preferred embodiment of the mechanical actuator apparatus MAA of the present invention, which is similar to the embodiment described above, with the exception that the magnetic member 18 is substituted by a magnetic mesh 38 of a suitable thickness and design, and preferably corresponding in size to the bottom film 16 and the touchscreen underside 11. It is noted herewith that only a single film 16 is preferably used in the alternate embodiment.

The magnetic mesh 38 is secured between the bottom film 16 and the underside 13 of the touchscreen TS, preferably by using an adhesive, or other means, such as electrostatic, magnetostatic, electromagnetic, etc., force. It is noted herewith that the magnetic mesh 38 may alternatively be mounted directly to the touchscreen underside 11 in the same manner, without using the film 16.

One would readily appreciate the advantage of providing the magnetic mesh 38 on the underside 11 of the touchscreen, in that a user can position the joystick 10 anywhere on the touchscreen TS, by simply detaching the joystick 10 from one position and re-positioning at another location, using the magnetic force between the magnetic member 32 and the magnetic mesh 38.

It is noted herewith that while the present invention is described and illustrated in conjunction with a tablet, it can be used with any electronic device, including, but not limited to, a television, videogame monitor, videogame console, a gaming device, a desktop computer, a laptop computer, a personal digital assistant (PDA), a fablet, a phablet, a cellphone, a mobile phone, a smartphone, or a combination thereof.

While this invention has been described as having preferred sequences, ranges, steps, order of steps, materials, structures, symbols, indicia, graphics, color scheme(s), shapes, configurations, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the claims appended hereto or presented later. The invention, therefore, is not limited to the preferred embodiment(s) shown/described herein.

REFERENCES

The following reference, and any cited in the disclosure herein, are hereby incorporated herein in their entirety by reference.
1. "Touchscreen" Wikipedia, the free encyclopedia, http://en.wikipedia.org/wiki/Touchscreen. Accessed Feb. 21, 2013, 9 pp.

What is claimed is:
1. In combination with an electronic device including a touchscreen with a first user interaction surface and a second surface, a joystick apparatus, comprising:
 a) a joystick including a handle portion and a cooperating base portion;
 b) said base portion including an upstanding sleeve;
 c) said handle portion including a skirt portion for operably engaging said sleeve for thereby securing a first magnetic member therebetween;
 d) an attachment member positioned on the second surface of the touchscreen and including a second magnetic member for engaging said first magnetic member; and
 e) said base portion including a conductive member for contacting the first user interaction surface of the touchscreen.
2. The joystick apparatus of claim 1, wherein:
 a) said second magnetic member is immovably positioned relative to said attachment member.
3. The joystick apparatus of claim 2, wherein:
 a) said attachment member is immovably positioned on the second surface.
4. The joystick apparatus of claim 3, wherein:
 a) said second magnetic member is positioned anywhere within the boundaries of said attachment member.
5. The joystick apparatus of claim 3, wherein:
 a) said attachment member is made of a clear film substantially corresponding in size to the second surface.
6. The joystick apparatus of claim 3, wherein:
 a) said second magnetic member comprises a magnetic mesh.
7. The joystick apparatus of claim 6, wherein:
 a) said magnetic mesh corresponds in size to the first user interaction surface.
8. The joystick apparatus of claim 6, wherein:
 a) said magnetic mesh is smaller or larger in size than the first user interaction surface.
9. The joystick apparatus of claim 2, wherein:
 a) said second magnetic member is positioned anywhere within the boundaries of the touchscreen.
10. The joystick apparatus of claim 1, wherein:
 a) said attachment member comprises a film having said second magnetic member embedded therein.
11. The joystick apparatus of claim 1, wherein:
 a) said attachment member comprises two films sandwiching said second magnetic member therebetween.
12. The joystick apparatus of claim 1, wherein:
 a) said second magnetic member is immovably positioned relative to the second surface and at a location corresponding to a predetermined position for said first magnetic member.
13. The joystick apparatus of claim 12, wherein:
 a) the predetermined position for said first said first magnetic member lies anywhere on the touchscreen.
14. The joystick apparatus of claim 13, wherein:
 a) said second magnetic member is smaller or larger in size than the second surface.
15. The joystick apparatus of claim 1, wherein:
 a) said upstanding sleeve defines a recess therein for holding said first magnetic member.
16. The joystick apparatus of claim 1, wherein:
 a) said skirt portion defines a recess therein for holding said first magnetic member.
17. The joystick apparatus of claim 1, wherein:
 a) the second surface is generally opposite to the first user interaction surface.
18. The joystick apparatus of claim 1, wherein:
 a) the second surface is disposed within the electronic device.
19. The joystick apparatus of claim 1, wherein:
 a) the electronic device comprises a television, videogame monitor, videogame console, a gaming device, a desktop computer, a laptop computer, a tablet, a personal digital assistant (PDA), a fablet, a phablet, a cellphone, a mobile phone, a smartphone, or a combination thereof.
20. An electronic device, comprising:
 a) a touchscreen including a first user interaction surface and a second surface;
 b) a magnetic mesh member positioned directly on said second surface for cooperating with an external mechanical actuator and covering substantially entirely the touchscreen; and
 c) said second surface being disposed within the electronic device.
21. The electronic device of claim 20, wherein:
 a) the mechanical actuator comprises a joystick.
22. The electronic device of claim 21, wherein:
 a) the joystick comprises a handle portion and a cooperating base portion;
 b) said base portion includes an upstanding sleeve; and
 c) said handle portion includes a skirt portion for operably engaging the sleeve for thereby immovably securing a magnetic member therebetween, said magnetic member and said magnetic mesh operably coupling the joystick with the touchscreen.
23. The electronic device of claim 22, wherein:
 a) said base portion defines a recess therein for holding said magnetic member.
24. The electronic device of claim 22, wherein:
 a) said skirt portion defines a recess therein for holding said magnetic member.
25. The joystick apparatus of claim 20, wherein:
 a) the electronic device comprises a television, videogame monitor, videogame console, a gaming device, a desktop computer, a laptop computer, a tablet, a personal digital assistant (PDA), a fablet, a phablet, a cellphone, a mobile phone, a smartphone, or a combination thereof.

26. A method of attaching a joystick to a touchscreen of an electronic device, comprising the steps of:
  a) providing a touchscreen with a user interaction surface and a generally opposite second surface, the second surface including a magnetic mesh mounted directly thereto and covering substantially entirely the touchscreen;
  b) providing a joystick including a magnetic member; and
  c) manipulating the joystick over the touchscreen to operably couple with the touchscreen via the magnetic member and the magnetic mesh.

27. The method of claim 26, wherein:
the second surface is disposed within the electronic device.

28. The method of claim 27 wherein:
  i) the joystick includes a handle portion and a cooperating base portion;
  ii) the base portion includes an upstanding sleeve; and
  iii) the handle portion includes a skirt portion for operably engaging the sleeve for thereby securing the magnetic member therebetween.

29. The method of claim 28, wherein:
the base portion defines a recess therein for holding the magnetic member.

30. The method of claim 28, wherein:
the skirt portion defines a recess therein for holding the magnetic member.

31. A method of attaching a joystick to a touchscreen of an electronic device, comprising the steps of:
  a) providing a joystick including a first magnetic member;
  b) providing a touchscreen, comprising:
    i) a user interaction surface and a generally opposite second surface;
    ii) the second surface including an attachment member mounted directly thereto and covering substantially entirely the touchscreen; and
    iii) the attachment member including a second magnetic member;
  c) manipulating the joystick over the touchscreen to operably couple with the touchscreen via the first and second magnetic members.

32. The method of claim 31, wherein:
the second surface is disposed within the electronic device.

33. The method of claim 32, wherein:
the second magnetic member is immovably positioned relative to the attachment member.

34. The method of claim 32, wherein:
the attachment member is made of a clear film.

35. The method of claim 32 wherein:
  i) the joystick includes a handle portion and a cooperating base portion;
  ii) the base portion includes an upstanding sleeve; and
  iii) the handle portion includes a skirt portion for operably engaging the sleeve for thereby securing the first magnetic member therebetween.

36. The method of claim 35, wherein:
the base portion defines a recess therein for holding the first magnetic member.

37. The method of claim 35, wherein:
the skirt portion defines a recess therein for holding the first magnetic member.

38. A method of attaching a joystick to a touchscreen of an electronic device, comprising the steps of:
  a) providing a joystick including a first magnetic member, and comprising:
    i) a handle portion and a cooperating base portion;
    ii) the base portion including an upstanding sleeve; and
    iii) the handle portion including a skirt portion for operably engaging the sleeve for thereby securing the magnetic member therebetween;
  b) providing a touchscreen, comprising:
    i) a user interaction surface and a generally opposite second surface;
    ii) the second surface including an attachment member mounted thereto; and
    iii) the attachment member including a second magnetic member;
  c) manipulating the joystick over the touchscreen so as to engage the first magnetic member with the second magnetic member.

39. The method of claim 38, wherein:
the base portion defines a recess therein for holding the first magnetic member.

40. The method of claim 38, wherein:
the skirt portion defines a recess therein for holding the first magnetic member.

* * * * *